United States Patent [19]

Ledet

[11] Patent Number: 5,184,538
[45] Date of Patent: Feb. 9, 1993

[54] HIGH EFFICIENCY STEAM COOKER

[75] Inventor: Brent A. Ledet, Metairie, La.

[73] Assignee: The Laitram Corporation, New Orleans, La.

[21] Appl. No.: 887,832

[22] Filed: May 26, 1992

[51] Int. Cl.$^5$ .................. A23L 3/00; A23N 12/00; A47J 27/16
[52] U.S. Cl. .................. 99/331; 99/443 C; 99/468; 99/477; 99/483
[58] Field of Search .......... 99/330, 331, 341, 473–479, 99/443 C, 443 R, 467, 468, 403, 410, 404, 516, 536, 483; 126/20, 369; 426/510, 511, 523; 452/5

[56] References Cited

U.S. PATENT DOCUMENTS

| | | |
|---|---|---|
| 1,992,398 | 2/1935 | Ryder . |
| 3,456,578 | 7/1969 | Pinsly ............................ 99/443 C |
| 3,491,679 | 1/1970 | Kelly ................................. 99/477 |
| 3,736,860 | 6/1973 | Vischer, Jr. ...................... 99/339 |
| 4,417,507 | 11/1983 | Shotwell ............................ 99/404 |
| 4,582,047 | 4/1986 | Williams ........................... 126/369 |
| 4,702,161 | 10/1987 | Andersen ........................ 99/536 |
| 4,809,596 | 3/1989 | Akutsu et al. .................... 99/483 |
| 4,862,794 | 10/1989 | Lapeyre et al. . |
| 4,873,107 | 10/1989 | Archer ............................ 99/443 C |
| 4,873,917 | 10/1989 | Sugimura et al. ............... 426/510 |
| 4,887,524 | 12/1989 | Ellis-Brown ........................ 99/467 |
| 4,937,090 | 6/1990 | Bichel . |
| 4,942,810 | 7/1990 | Zittel et al. ........................ 99/516 |
| 5,072,663 | 12/1991 | Ellis-Brown . |

Primary Examiner—Timothy F. Simone
Attorney, Agent, or Firm—Laurence R. Brown; James T. Cronvich

[57] ABSTRACT

Shrimp and other food products carried on a plastic modular conveyor belt are efficiently cooked at atmospheric pressure in the presence of saturated steam protected by a confining receptacle from dilution by insulating air. The steam condenses by transfer of cooking energy, the condensate dropping downwardly in the receptacle by gravity. By passing products through the constant 212 degree F. saturated steam zone residing at the upper portion of the cooking receptacle, the belt speed and distance through a modular cooking compartment control the cooking time for uniform production. The steam is replenished through a proportional flow valve to replace only that amount of steam expended in cooking. Thus, temperature is sensed at a cooler position under the saturated steam cooking zone where temperature is typically 190-200 degrees to detect variations of the amount of steam condensed in exchange of heat in cooking the product, and to proportionately control the flow of replacement saturated steam. Critical control of cooking receptacle rejection of contaminating air maintains a substantially static pure saturated steam layer in the upper portion. The lower portion contains lower temperature air/vapor mixture. This permits simplified fully automatic steam replenishment as a function of sensed temperature and thus produces efficient cooking without losses of energy from either excessive steam flow or dilution of saturated steam cooking efficiency from air or fluid vapors admitted into the cooking receptacle.

19 Claims, 4 Drawing Sheets

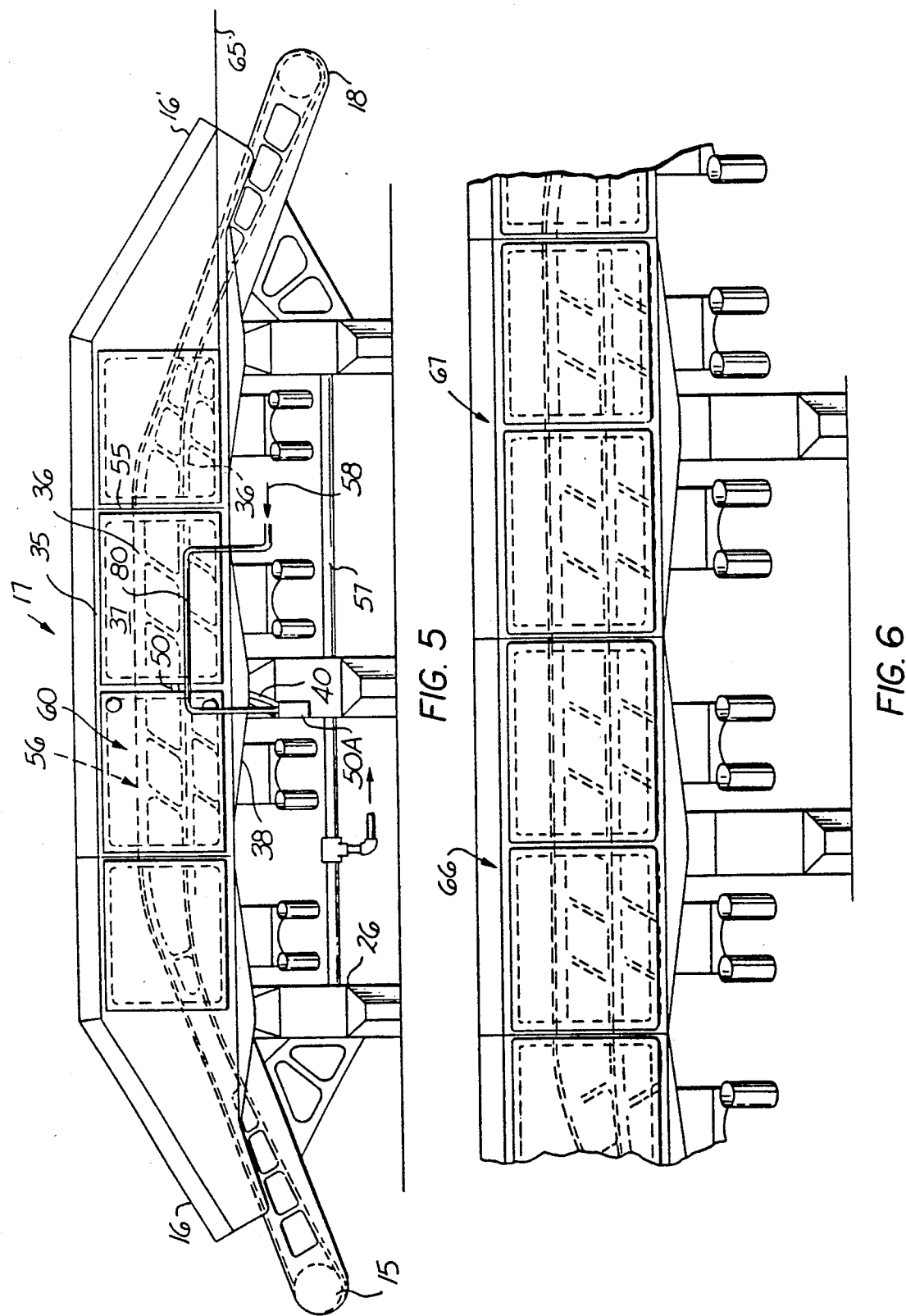

HIGH EFFICIENCY STEAM COOKER

TECHNICAL FIELD

This invention relates to steam cooking of food products, in particular shrimp, and more particularly it relates to industrial high volume cookers conveying products such as raw shrimp through a steam cooking chamber on conveyor belts for cooking.

BACKGROUND ART

Steam cookers through which conveyor belts carry food products are well known. For example, skins are loosened on tomatoes carried on a conveyor belt in Ryder, U.S. Pat. No. 1,992,398, Feb. 26, 1935 by maintaining a cooking zone of superheated steam at above atmospheric pressure. There is no attempt to efficiently cook the steam at high pressure is used to purge air out of the cooking zone and thus the steam energy is inefficiently used for cooking the food.

Vegetables are steam cooked by vaporized water over a body of boiling water in Bichel, U.S. Pat. No. 4,937,090, Jun. 26, 1990. The lower cooking temperatures, criticality in temperature and product controls, and inefficiency of heat exchange between the product and heating medium encompass a long cooking time and prevents uniformity and efficiency of cooking from the energy source that heats the water tank.

Ellis-Brown, U.S. Pat. No. 5,072,663, Dec. 17, 1991 specially teaches a cooker for shrimp with steam flowing at a pressure higher than atmospheric through a cooking zone containing a conveyor belt. Input cooking steam is mixed with air carried into the compartment by the belt, and vapors released by the cooking shrimp before reaching the shrimp cooking region, so that the input steam energy is not concentrated and spent solely upon the shrimp being cooked. Furthermore uniform cooking conditions are difficult to obtain because of dependency upon variable air temperature and humidity for example. Also hotter steam migrating to the top of the compartment is discharged out of the top of the cooker to further decrease cooking efficiency. The incoming steam pressure keeps the compartment above atmospheric pressure thus further tending to force the hot steam out into the atmosphere. Since an attempt is made to conserve minor energy losses through cabinet walls with specially formed insulation of stainless steel housing, it is clear that a more efficient system was not recognized.

A previous development is a saturated steam cooker in the George C. Lapeyre, et al. U.S. Pat. No. 4,862,794, Sep. 5, 1989 for APPARATUS FOR CONTROLLING PRECOOKING AND MACHINE PEELING SHRIMP. This cooker carries shrimp on a conveyor into a shallow inverted open bottom box into which is continuously fed saturated steam near the closed top panel where it remains until condensation descends into the atmosphere through the open bottom as it cools from the cooking of shrimp on the conveyor belt saturated steam at the constant temperature of 212 degrees F. Thus, as long as the saturated steam is replenished as needed to replace cooking energy for the amount of shrimp cooked in its presence, the cooking temperature remains constant There is a significant advantage in keeping air and vapors from the saturated steam by the flow of fresh saturated steam into the cooking region.

This prior art cooker works well, but has been found to have operational deficiencies which are resolved by the present improved cooker. For example, the shallow open bottom box structure permits the escape of enough hot steam to reduce cooking efficiency. Also, a shallow open bottom container for confining saturated steam permits entry of contaminants such as air or internal vapors in response to external and internal air flow paths. For example, if in the vicinity of cross winds from an open window or heater duct in a plant, the retention of uncontaminated saturated steam in the cooking region necessary for cooking efficiency and repeatable cooking quality control is not feasible.

Furthermore, the cooking of various sizes of shrimp at differing input temperatures and moisture content, etc., when carrying various loading densities of raw shrimp in industrial quantities on a movable conveyor belt through the cooker imposes a wide range of cooking conditions. The prior art cookers could not handle efficiently such wide ranges of conditions encountered in practice with efficient cooking methods at high volume industrial capacity where cooking speeds must be high without deterioration of consistent product quality under simple and effective automatic control conditions. For example, the shallow height of the cooking chamber in the Lapeyre et al. cooker makes it difficult to maintain control under varying thermal product loads.

Thus this invention has the objective of improving the state of the art by providing an improved automatically controlled cooking chamber with internal pressure substantially atmospheric that prevents dilution or variation of the 212 degree F. cooking energy of saturated steam surrounding the product being cooked Further, it is a general objective of the present invention to provide more efficient and uniform cooking methods and equipment adapted to higher volume, higher speed industrial use.

DISCLOSURE OF THE INVENTION

Improvements in the control and efficiency of cooking in industrial cookers carrying products through a steam cooking chamber on a conveyor belt are afforded by this invention. To obtain significantly improved efficiency from a saturated steam energy source for cooking shrimp and other food products, such as chicken strips, vegetables, and other shellfish, a substantially enclosed cooking chamber having an internal pressure substantially atmospheric employs saturated steam at substantially 212 degrees F. into which the products to be cooked are immersed. Provisions are made for constant temperature cooking with good cooking energy transfer efficiency from pure saturated steam, and for simple effective controls to replenish fresh saturated steam at a rate proportional to the cooking energy expended in the product. (Hereinafter, all references to cooking temperatures of 212° F. imply an ambient condition of standard atmospheric pressure For other ambient pressures, the cooking temperature is the corresponding boil temperature of water.)

A cooking region is provided for confining by gravity saturated steam which rises and remains in the upper zone of a closed compartment member. The saturated steam is introduced into the cooking region at a predetermined rate to replace condensed steam and permit that condensate to drop out of the cooking region. The saturated steam flow rate is controlled to maintain a constant temperature of less than 212 degrees at a position in a lower zone of the cooking region typically being between about 190 and 200 degrees F., to thus automate simply the cooking process for high cooking efficiency from the input steam, which thus is more efficient than conventional prior art systems that permit input steam to be mixed with air and vapors throughout the cooking region.

The food products are cooked by introducing them into the constant 212 degree F. cooking region for a predetermined time, established by the speed of the conveyor belt through the cooking region. A plastic conveyor belt conserves loss of steam energy usually expended in heating a metal belt. The constant cooking temperature keeps automated controls simple and effective in reproducing cooking conditions for uniform quality control. By controlling the flow of steam, vapor and air within the cooking chamber to prevent dilution of saturated steam in the cooking region, variations of temperature, cooked food quality and uniformity, and cooking inefficiencies are eliminated as well as the danger of oxidation from air contamination. Energy losses from discharge of hotter steam are eliminated, and efficiencies are improved by the efficient heat transfer interface between saturated steam and the product to the exclusion of insulating air or vapors which absorb and waste heat energy.

In particular it is recognized that a cooking region of considerable height is required for maintaining in the cooking region substantially static flow conditions restricted to the downward movement by gravity condensate formed by the transfer of heat energy into the product and the corresponding replenishment of condensed steam with fresh saturated steam. Thus, any flow paths from extraneous air or vapors must be eliminated to maintain quality and efficiency. Protective sidewalls adjacent the cooking region define a deep chamber providing a greater thermal capacity of saturated steam in the upper zone of the chamber, thereby simplifying thermal control. Substantially closed outer chamber walls insure elimination of substantially all contaminating air and vapors from the upper zone.

Further objects, features and advantages of the invention will be found throughout the following description, drawings and appended claims.

BRIEF DESCRIPTION OF THE DRAWINGS

In the accompanying drawings, wherein like reference characters refer to similar features throughout the several views to facilitate comparison:

FIG. 5 is a side view sketch of a cooking conveyor embodiment of the invention showing modular construction and control system features;

FIG. 6 is a side view sketch of a further modularized high capacity industrial cooking conveyor embodiment for higher volume and cooking speed capacity.

THE PREFERRED EMBODIMENTS

Figure 1:
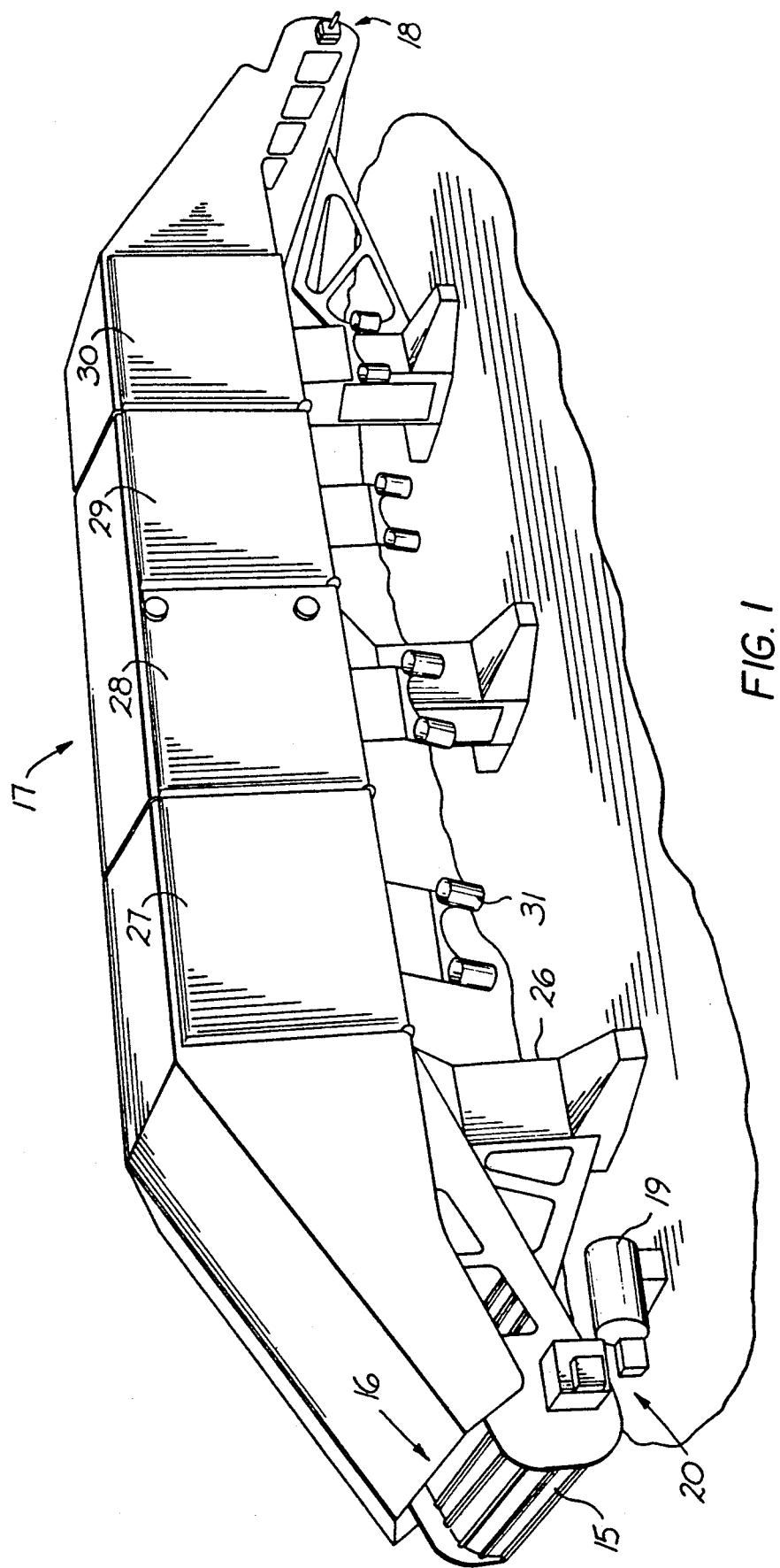
FIG. 1 is a perspective view of a steam cooker embodiment of the invention with a conveyor belt for transporting a product to be cooked, such as shrimp, through the cooker at a controlled belt speed.

Now with reference to the accompanying drawing, the features and operational characteristics of the invention will be described in more detail. As seen from FIG. 1, a product to be cooked, such as shrimp, is loaded on conveyor belt 15 at the entrance port 16 for conveyance through the cooker cabinet 17 toward the output port 18. Preferably the endless conveyor belt 15 is plastic for reducing heat losses from the cooker through radiation from a heated metal belt. A belt drive motor 19 and belt speed control system 20 is provided for varying the dwell time of the product on the belt in the cooker, as a cooking control feature. Thus, as required for cooking different products or handling different product loading densities on the belt, a desired cooking time can be established. Support legs 26 are provided with levelling adjustments. Doors 27 to 30 are moved downwardly against brackets 31 for access into the internal cooking region for easy access to the inside of the cooker.

Figure 2:
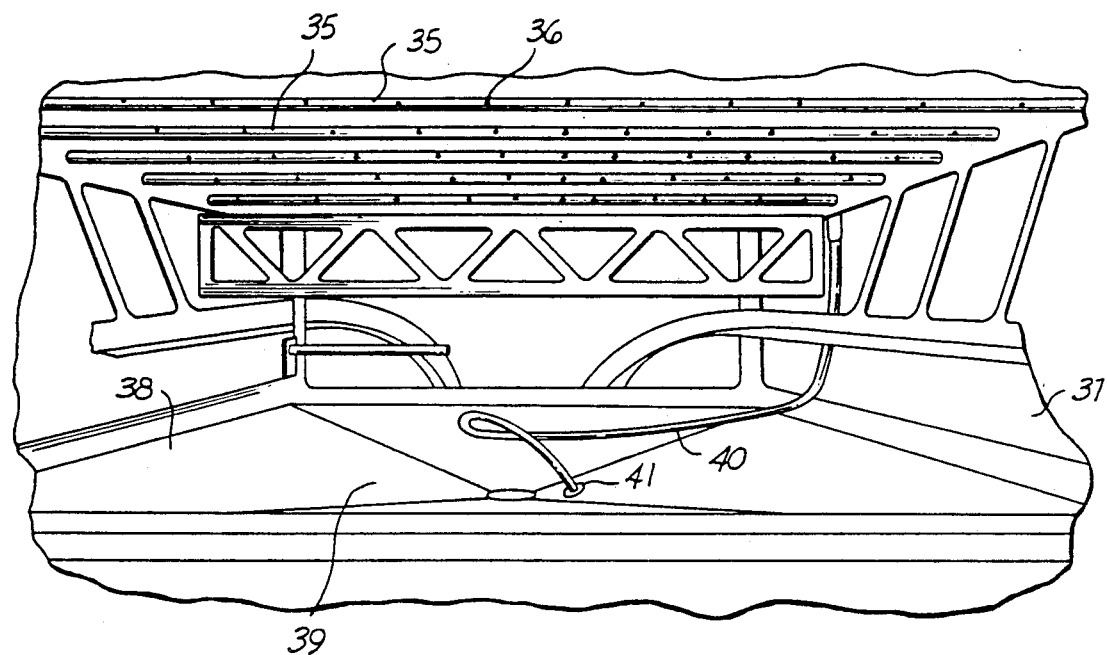
FIG. 2 is a cut away view, without the conveyor belt in place, looking into the interior of the cooker cooking region toward the conveyor belt entrance port, showing a set of steam inlet pipes and ports, and a lower panel with condensation outlet port.

A lower part of the internal cooking region is seen in FIG. 2 looking toward the belt inlet port 16 without the conveyor belt in place. Disposed in the upper cooking zone is an interconnected manifold or set of steam inlet pipes 35 dispersed along the heating chamber for introducing saturated steam at 212 degrees F. The multiple outlet holes or slits 36 in steam pipes 35 are directed laterally substantially in a plane parallel to the belt (not shown) which would ride directly above the steam inlet manifold pipes 36. Thus, any product residue would not tend to drop into and clog the holes 36. It is important to realize in connection with this invention that the saturated steam is about half the density of air, and that the cooking region is maintained at nearly atmospheric pressure, so that the saturated steam rises in the cooking chamber to its upper limit defined by the top panel structure of the cooker 17, thus surrounding the products to be cooked on the belt.

As later set forth in more detail, the saturated steam is introduced at a rate that assures a saturated steam atmosphere surrounding the belt in the upper zone of the cooking region. As the steam cooking energy is exchanged with the products being cooked, the steam changes phase to liquid condensate (mist and droplets) and drops by gravity to the bottom of the cooking chamber. The belt return path is through the cooking chamber to assure that heat losses from radiation to a cooler environment are reduced, thus contributing to greater cooking efficiency provided by the cooker system of this invention.

Precaution is taken that external flow of air or vapor is kept out of the cooking region by the sidewalls 37 and bottom closure plate 38, thereby to retain a substantially static layer of saturated steam in the cooking region. The saturated steam layer extends downward from the top of the chamber to at least the level of the product on the belt. Below the steam layer is a layer comprising condensate cooler than the saturated steam. Condensate dripped from the product is accumulated by the funnel like contour of the bottom plate 38 and funnelled into the condensate discharge line 39. Steam inlet line 40 is introduced through an opening plate 41 in the bottom plate 38. The critical depth of the sidewalls 37 minimizes the loss of saturated steam through the belt outlet port 16 and outlet port 16'. The inlet steam rate thus is to be controlled in the manner later discussed to substantially equally replace the condensed saturated steam.

Figure 3:
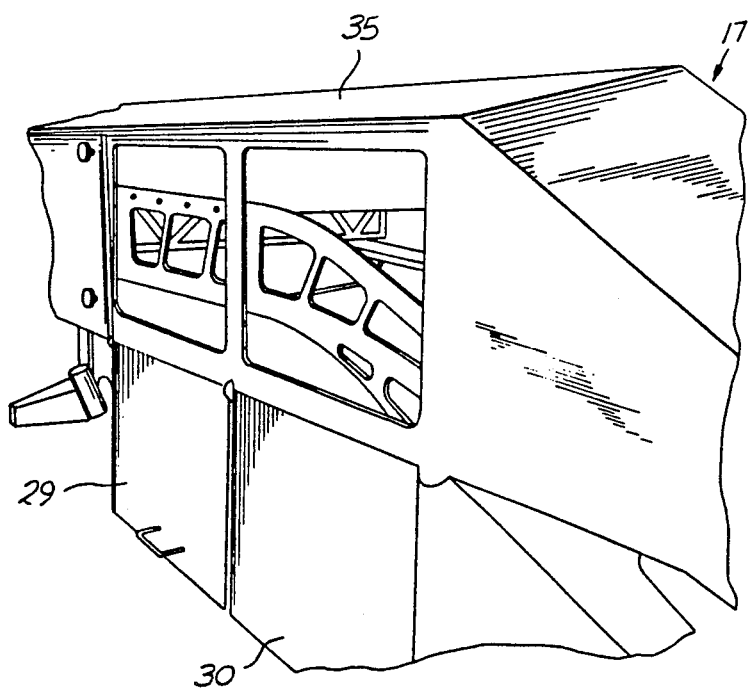
FIG. 3 is a perspective fragmental view showing the interior cooking region and conveyor belt support framework with open side access doors.
Figure 4:
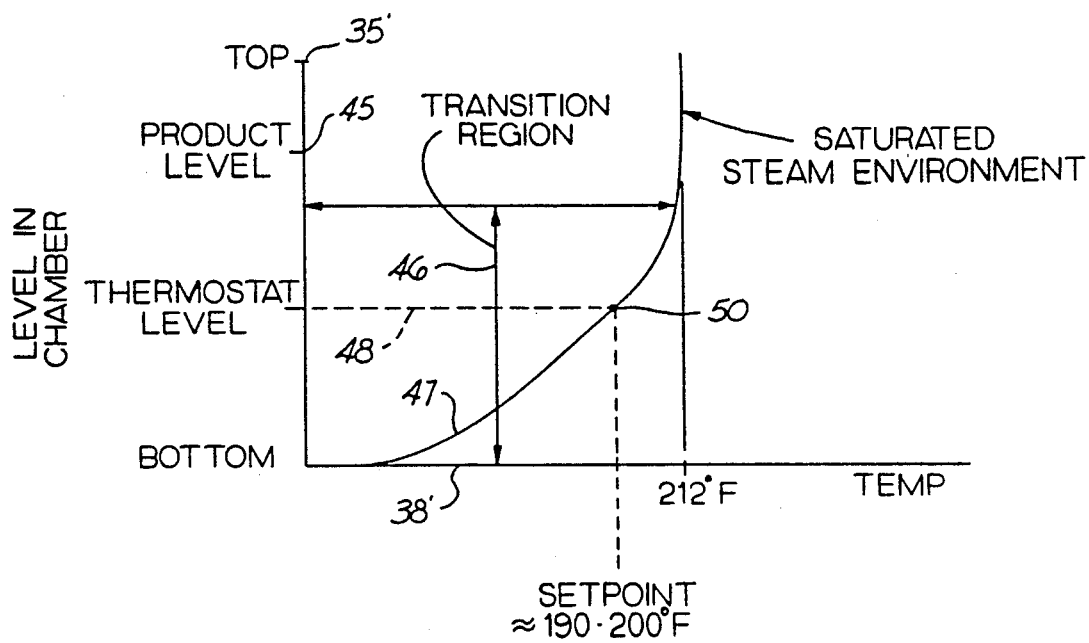
FIG. 4 is a graphical chart illustrating the saturated steam behavior in the cooking region which contributes to efficient cooking and simple regulation of cooking conditions for repeatable quality control with various product characteristics and loading conditions.

In FIG. 3, the access doors 29, 30 are moved downwardly to show the interior cooking chamber with the belt removed. The upper panels 35 enclose the cooking region to confine the saturated steam and limit its upward flow to the chamber, as inferred at the top 35' of the graph of FIG. 4. This graph defines a product level 45, a transition region 46, comprising a mixture of cooler and heavier air and condensed water vapor, as seen from the temperature graph line 47, and a thermostat sensor level 48, as well as the bottom enclosure level 38'. Above the transition region in the upper zone of the cooking region the saturated steam is at its 212 degree F. temperature, and the product is in essence immersed into the saturated steam for cooking at product level 45 to be fully surrounded by saturated steam free of insulating air, thereby assuring efficient transfer of the steam energy to the product for fast efficient cooking Since the cooking temperature is always at a constant 212 degrees, simply regulating cooking time in the cooking region assures a consistent quality of output cooked product. Thus, simply controlling belt speed will control the product dwell time and the amount of cooking of the product, without attention to any other variable.

Also the steam input control of this system is very simple, because of the critical deep compartment relationship between the protected upper and lower zones of the cooking region that maintain the stratification of the pure saturated steam in the upper zone and the lower temperature condensate in the lower zone. Thus, a thermostat sensor 50 positioned at a predetermined height in a stable region of the lower temperature zone operates a proportional release of only enough fresh saturated steam to keep the temperature at the sensor, typically 190-200 degrees F., constant. This assures maintenance of the 212 degree cooking temperature in the upper region and fast reliable variable adjustment of steam input to fit the needs and conditions of operation. For example, if there is a gap in the product on the conveyor belt, the system runs effectively with very little new steam ready immediately to operate at full load when the product appears and condenses the saturated steam in the upper zone to tend to lower the temperature at the sensor by the rising of the bottom level of the pure saturated steam layer. Adjustments are made in both directions automatically therefore with very simple controls to keep the system running at top efficiency. For example, a commercially available self operating variable proportional steam valve with sensor is available from H. O. Trerice Co. in Detroit Mich. for various pipe sizes under the "Trerice Series No. 91000" brand of temperature regulators.

The foregoing relationship is also configured in FIG. 5 with the conveyor-cooker 17 and conveyor belt 15 shown in side view phantom with access doors open. Note that a cooker module 55 is inserted between input port section 16 and output port section 18 of the conveyer 15 transport arrangement, as seen behind the two open doors disposed along a flat length 56 of the conveyor support bracing. Thus the closed bottom pan 38 leads into condensate drainage conduit 57 and passes steam line 40 which receives steam from a high pressure steam conduit 80 routed through the bottom pan 38 to an unshown source at lead 58 and supplying steam to the control valve 50A through the bottom pan 38. Enclosing the high pressure steam conduit within the cooking chamber increases the efficiency of the cooker and eliminates the need for insulating the conduit within the chamber. A thermostatic sensor 50 is positioned substantially in the lower zone center 59 of module 55. The thermostatic regulator and control valve 50A is set to maintain a constant temperature at sensor 50, typically 190 degrees F.

The product rides on belt 15 through the upper region 60 in the saturated steam atmosphere, supplied by manifold discharge nozzles 36. Note the level 65 of the inlet and outlet ports for the conveyor belt, open to the atmosphere to keep the pressure within the cooking chambers substantially at the desired and critical atmospheric pressure level. Also it is critical that air is heavier than the hot steam and thus does not tend to rise for conveyance into the higher level cooking chamber, except for the trivial amount that is carried by friction with the conveyor belt and product upwards into the very much lighter saturated steam atmosphere to rapidly descend by force of gravity and keep the substantially pure saturated steam in the cooking region. Prior art systems have generally not so effectively controlled and eliminated undesirable air, vapor and contaminant flow paths within a steam cooker, and thus could not provide the cooking efficiency and quality control with simplified control systems that this system symbiotically produces.

As seen from FIG. 6, two series modular cooking sections 66, 67 are provided along the conveyor belt, each provided with similar temperature controls as shown in FIG. 5. Thus, the product is cooler in section 66 than in section 67, and the saturated steam released in each compartment is substantially only that necessary to replenish cooking energy needed from the saturated steam. With the two cooking sections, 66, 67, the range of throughput quantity of cooked shrimp per unit time for example is increased for industrial cooking purposes. Thus, a longer dwell time is available with the longer belt travel distance through saturated steam, which provides more cooking energy so that the belt speed may be increased for more product throughput. One of the modules could be replaced or supplemented by a washing or browning module if desired.

Figure 7:
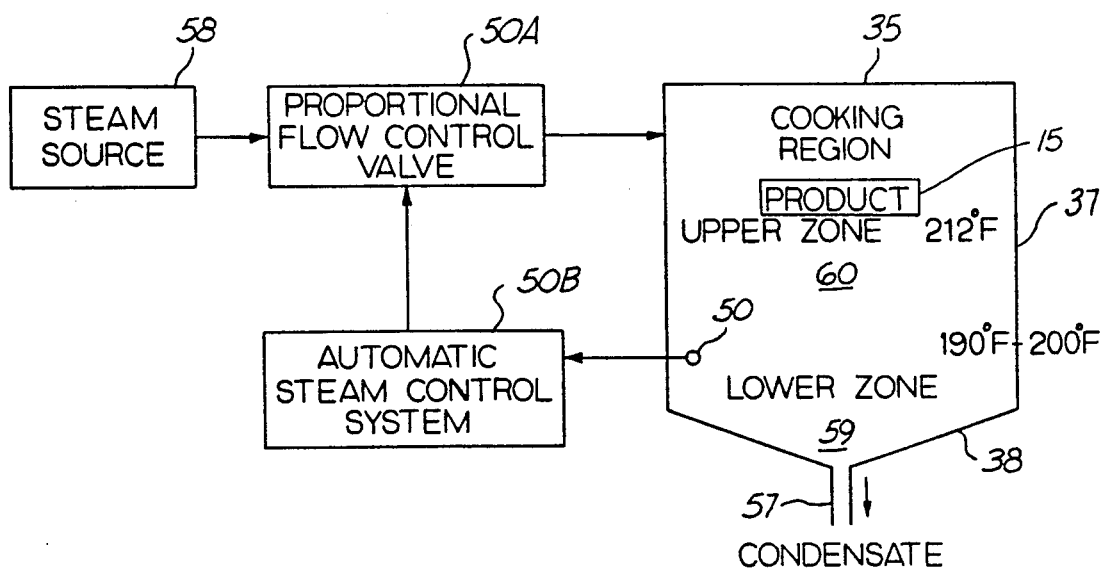
FIG. 7 is a system block diagram illustrating cooker and control system features afforded by this invention.

In FIG. 7, the relationship of the steam input control system to the cooking region structure afforded by this invention is set out in block diagram format. Incoming steam from source 58 is proportionately controlled by valve 50A to decrease or increase and keep the 190-200 degree F. temperature at thermostat sensor 50 in the lower cooking region zone stable, by means of the automatic control system 50B that adjusts valve 50A in response to sensed temperature at sensor 50. This maintains the saturated steam atmosphere in the upper zone 60 of the cooking region and about the product on conveyor belt 15, and permits the condensate to drop toward outlet channel 57 substantially solely by force of gravity since only substantially that steam is being replaced that is condensed in cooking the product. Thus, this system corrects the significant deficiency of prior art devices that force hot steam into and out of a cooking chamber and lose energy that should have gone into cooking the product.

It should therefore be evident that this invention has improved the state of the art and has unobviously changed cooking conditions in a long standing art to provide a more efficient cooking method that can be consistently quality controlled with simple equipment than has heretofore been feasible. Accordingly those unique features and combinational reactions that signify the nature and spirit of this invention are defined with particularity in the following claims.

I claim:

1. A food cooker system, comprising in combination:
   a conveyor belt for conveying a product to be cooked;
   a substantially open-ended, product-carrying cooking chamber compartment with a belt entrance port at a first end, a belt exit port at an opposite end, and a cooking region therebetween defining top portion sidewalls of predetermined height adapted to receive, entrap and retain an upper layer of saturated steam to the exclusion of air, said entrance port and exit port being disposed below the layer of saturated steam;
   transport means disposed for passing the conveyor belt with said product over a path passing upwardly into the chamber through the entrance port, through the top portion of said cooking region, and downwardly out of said chamber through the exit port;
   pressure control means comprising said entrance and exit ports for maintaining substantially atmospheric pressure inside the cooking chamber;
   energy supply means for supplying uncontaminated saturated steam directly into the cooking region at a flow rate providing cooking energy expended in cooking said product and for maintaining saturated steam at 212 degrees F. in said top portion to the exclusion of air and condensation in the top portion, and
   a fluid control system within the cooking chamber to control the cooking region atmosphere and maintain a flow pattern substantially consisting of downward gravity movement for discharge of any gathered condensation and product residue, while restraining exit of saturated steam and entrance of any other significant air or fluid flow patterns into the cooking region, thereby to approach a static atmosphere of saturated steam at 212 degrees F. in the cooking region with product transported therethrough.

2. The system of claim 1, further comprising a manifold of steam pipes with a plurality of openings distributed in said cooking region oriented in a plane substantially parallel with the conveyor belt path through the cooking region.

3. The system of claim 1 with a conveyor belt return path within the cooking chamber, thereby to reduce energy losses due to radiation from the conveyor belt.

4. The system of claim 1 with two modular units coupled together along the conveyor belt path for defining said cooker region, thereby permitting more products per unit time to be carried by the belt through the saturated steam resident in the cooking region.

5. The system of claim 1 having an uninsulated high temperature steam conduit passing through the cooking chamber to a steam inlet control valve.

6. The system of claim 1 wherein said energy supply means further comprises automatic control means for supplying saturated steam at a rate substantially proportional to the cooking energy expended in the product passing through the cooking region.

7. The system of claim 6 wherein a steam rate control sensor is provided comprising temperature sensing means positioned at a fixed position below the cooking region exhibiting a temperature x lower than 212 degrees F. and the automatic control means variably regulates the steam flow rate to maintain the temperature x at said sensing means substantially constant.

8. The system of claim 6 further comprising variable control means for controlling belt speed.

9. The system of claim 8 further comprising proportional steam flow valve means, and means for varying the steam flowing through said proportional valve means as a function of variations of the temperature x.

10. The system of claim 1 further comprising variable cooking control means for varying the belt speed.

11. The system of claim 1 having two consecutive cooking chamber sections along the path of the belt respectively comprising separate cooking regions, and corresponding automatic control means for introducing steam into each said chamber section at a feed rate restoring cooking energy lost in the respective cooking chamber section.

12. The system of claim 1 having at least two consecutive chamber sections along the path of the belt for processing the product, at least one of which comprises said cooking chamber.

13. The system of claim 1 wherein said cooking chamber further comprises substantially parallel upper and lower enclosure panels joined by said sidewalls defining said open-ended chamber through which said conveyor belt is passed.

14. The system of claim 1 wherein said pressure control means and fluid control system substantially comprise entryway and exitway apertures in the chamber for said conveyor belt open to the atmosphere and located at a critical level below said upper zone thereby to prevent air entrance into the upper zone.

15. The system of claim 13 wherein said lower enclosure panel comprises outlet flow means for fluid condensed from steam formed from energy exchange with the products being cooled.

16. A food cooker system adapted for moving a product to be cooked into a saturated steam atmosphere at a substantially constant temperature of 212 degrees F. at atmospheric pressure, comprising in combination:
   a cooking chamber compartment defining a product conveying path comprising a top wall, bottom wall and joining sidewalls, said sidewalls being of enough depth for retaining said steam to the exclusion of air through an upper zone of a resident cooking region of the compartment by its lighter than air density characteristic and for passing condensate of a temperature lower than 212 degrees F. into a lower zone wherein all discharge from the compartment moves downwardly by gravity from the upper zone,
   a conveyor belt for carrying products through said product conveying path,
   cooking energy supply means including a variable proportionately controllable steam inlet valve for introducing saturated steam into said upper zone,
   a temperature sensor positioned in the lower zone, and
   automatic control means for varying the inlet valve to introduce saturated steam at a rate to substantially proportionately replace cooking energy loss from said upper zone expended in cooking said product thereby maintaining the 212 degrees F.

temperature in the upper zone as a function of variation of temperature at the sensor from a predetermined value.

17. The cooker system of claim 16 further comprising:
cooking control means for controlling the dwell time of the cooked product in the upper portion.

18. The cooker system of claim 17 wherein said conveyor belt passes from an air containing atmosphere below the upper zone into the upper zone to move said product into the saturated steam atmosphere without loss of saturated steam to the atmosphere, and wherein the cooking control means further comprises means for controlling the speed of the belt through the cooking region.

19. The cooker system of claim 18 wherein said conveyor belt further comprises a plastic modular belt formed of a good thermal insulating material, thereby to extract a minimal amount of heat energy from said saturated steam in the cooking region.

* * * * *